(No Model.)
F. G. ALTMANN & F. POMMER.
NEEDLE THREADER FOR SEWING MACHINES.
No. 252,007.   Patented Jan. 10, 1882.
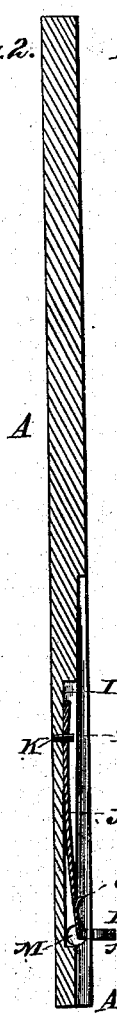
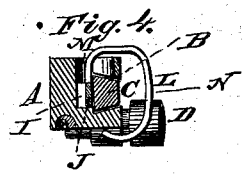
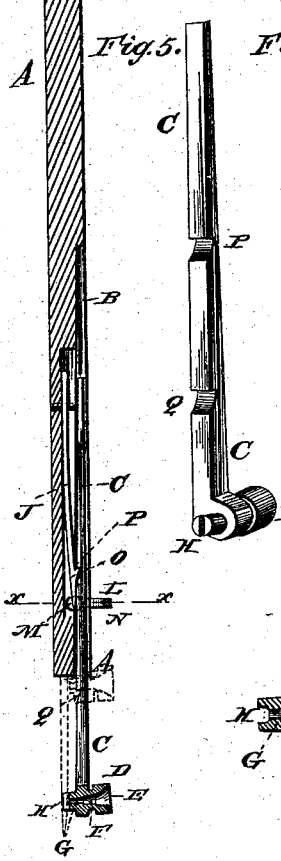
WITNESSES
INVENTOR
Attorneys
N. PETERS, Photo-Lithographer, Washington, D. C.

UNITED STATES PATENT OFFICE.

FRANK G. ALTMANN AND FRED POMMER, OF EDINA, MISSOURI.

NEEDLE-THREADER FOR SEWING-MACHINES.

SPECIFICATION forming part of Letters Patent No. 252,007, dated January 10, 1882.

Application filed October 26, 1881. (No model.)

*To all whom it may concern:*

Be it known that we, FRANK G. ALTMANN and FRED POMMER, of Edina, in the county of Knox and State of Missouri, have invented certain new and useful Improvements in Needle-Threaders for Sewing-Machines; and we do hereby declare that the following is a full, clear, and exact description of the invention, which will enable others skilled in the art to which it appertains to make and use the same, reference being had to the accompanying drawings, which form a part of this specification.

Figure 1 is a perspective view of a needle-bar having our improved threading attachment. Fig. 2 is a vertical sectional view of the needle-bar, the threading device having been removed. Fig. 3 is a similar view, showing the threading device in position. Fig. 4 is a horizontal sectional view on the line *x x*, Fig. 3. Fig. 5 is a view of the threading device detached. Fig. 6 is a view of the spring detached, and Fig. 7 is a horizontal sectional view of the threading-tube.

Corresponding parts in the several figures are denoted by like letters of reference.

This invention relates to needle-threading attachments for sewing-machines; and it consists in certain improvements in the construction and arrangement of parts, which will be hereinafter fully described, and particularly pointed out in the claims.

Referring to the drawings hereto annexed, A represents the needle-bar of a sewing-machine, in the side of which a dovetailed groove, B, is cut slantingly, as shown, or so as to be deeper at the lower than at the upper end, for the purpose to be hereinafter described. Sliding in said groove is a rigid rod or arm, C, which may likewise be thicker at its lower than at its upper end, its incline being proportioned after that of the slanting or inclined groove B. The rod or arm C carries at its lower end the threading-tube D, the construction of which will be clearly understood by reference to Fig. 7 of the drawings. It consists of a block of metal having a longitudinal opening or perforation, consisting, first, of a flaring or bell-shaped mouth or opening, E; second, of a gradually-contracting conical central section, F; and, thirdly, of a narrow regular cylindrical guide section or opening, G. At the termination of the latter the tube D is provided with a vertical notch, H.

In the lower end of the groove B is cut a narrow auxiliary groove, I, to accommodate a flat spring, J, which is secured in position by means of a screw or rivet, K. The lower end of spring J is bent so as to form a shank, L, passing through a slot, M, in the side of the needle-bar, and the end of said shank is bent so as to form a thumb-piece, N, coming directly in front of the sliding rod C, so as to be conveniently operated. Near the lower end of spring J is formed a tooth, O, capable of engaging one of a pair of notches, P Q, in the rear side of the sliding rod C.

The operation of our invention is as follows: When the bar C is in a raised position (in which it is retained by the spring-tooth O engaging the notch Q near the lower end of said bar) the threading-tube D is about on a level with the lower end of the needle-bar, as shown in dotted lines in Fig. 3 of the drawings. By pressing the thumb-piece N of spring J the tooth O is disengaged from the notch Q, and the rod C may now be lowered in a diagonal direction, owing to the inclined shape of the groove B, in which it moves. The incline of groove B is to be so regulated that when the opening G of the threading-tube is on a level with the eye of the needle it shall at the same time be closely in contact therewith, so that the needle-eye forms practically a continuation of the threading-tube, the vertical notch H of which forms a guide to embrace the sides of the needle. When the threading-tube reaches this point the notch P in bar C engages the spring-tooth O, and said rod or bar is thus prevented from being lowered any farther, and thereby bringing the threading-tube out of register with the needle-eye. Any further downward motion might also bend or otherwise injure the needle. The threading-tube having been thus adjusted, the thread is introduced into the flaring or bell-shaped opening E. If, in being thus introduced, the end of the thread should strike one of the sides, and thus become bent, the central gradually-contracting section, F, serves to straighten it before it enters the narrow cylindrical section G, which conducts it through the eye of the needle. The rod C is now raised to its original position, and the machine is then ready for operation.

We desire to state that instead of cutting the grooves B I in the needle-bar proper they may be cut in a separate metal plate and the spring and rod carrying the threading-tube arranged in the latter, which may then be attached to the needle-bar, bearings for said plate being cut in the frame of the machine.

The advantages of our invention are obvious. It is simple and easily operated. The tube being lowered to a level with the eye of the needle, the thread is passed through. The tube is then raised and serves as a guide for the thread, which of course has to pass through it to the needle. If, through wear of the spring-tooth O, the threading-tube shall be prevented from registering with the needle-eye, a new spring may be substituted at a trifling expense.

Having thus described our invention, we claim and desire to secure by Letters Patent of the United States—

1. The combination, with the needle-bar having inclined dovetailed groove B and auxiliary groove or recess I, of the spring J, having tooth O and thumb-piece N, and the rigid sliding rod C, having notches P Q and threading-tube D, as herein described, for the purpose set forth.

2. The combination of the grooved needle-bar A, having slot M, the slide D, having notches P Q, and the spring J, having tooth O, shank L, and thumb-piece N, the latter bent so as to come in front of the slide D, as herein described, for the purpose set forth.

In testimony that we claim the foregoing as our own we have hereto affixed our signatures in presence of two witnesses.

FRANK G. ALTMANN.
FRED POMMER.

Witnesses:
WILLIAM CLANCY,
JACOB DIETRICH.